UNITED STATES PATENT OFFICE.

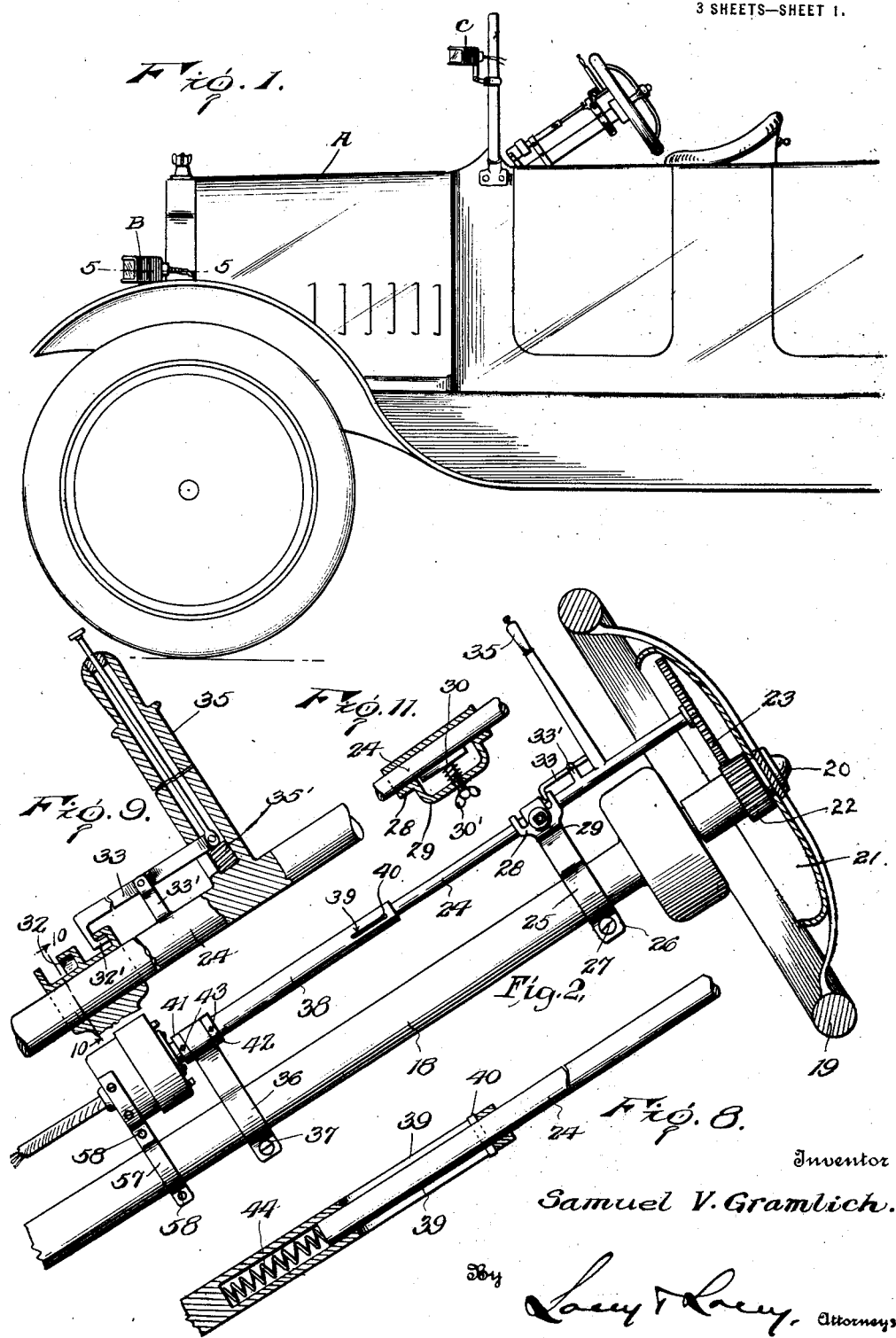
S. V. GRAMLICH.
ILLUMINATING SYSTEM FOR VEHICLES.
APPLICATION FILED AUG. 31, 1920.
1,426,060.
Patented Aug. 15, 1922.
3 SHEETS—SHEET 1.
Inventor
Samuel V. Gramlich.

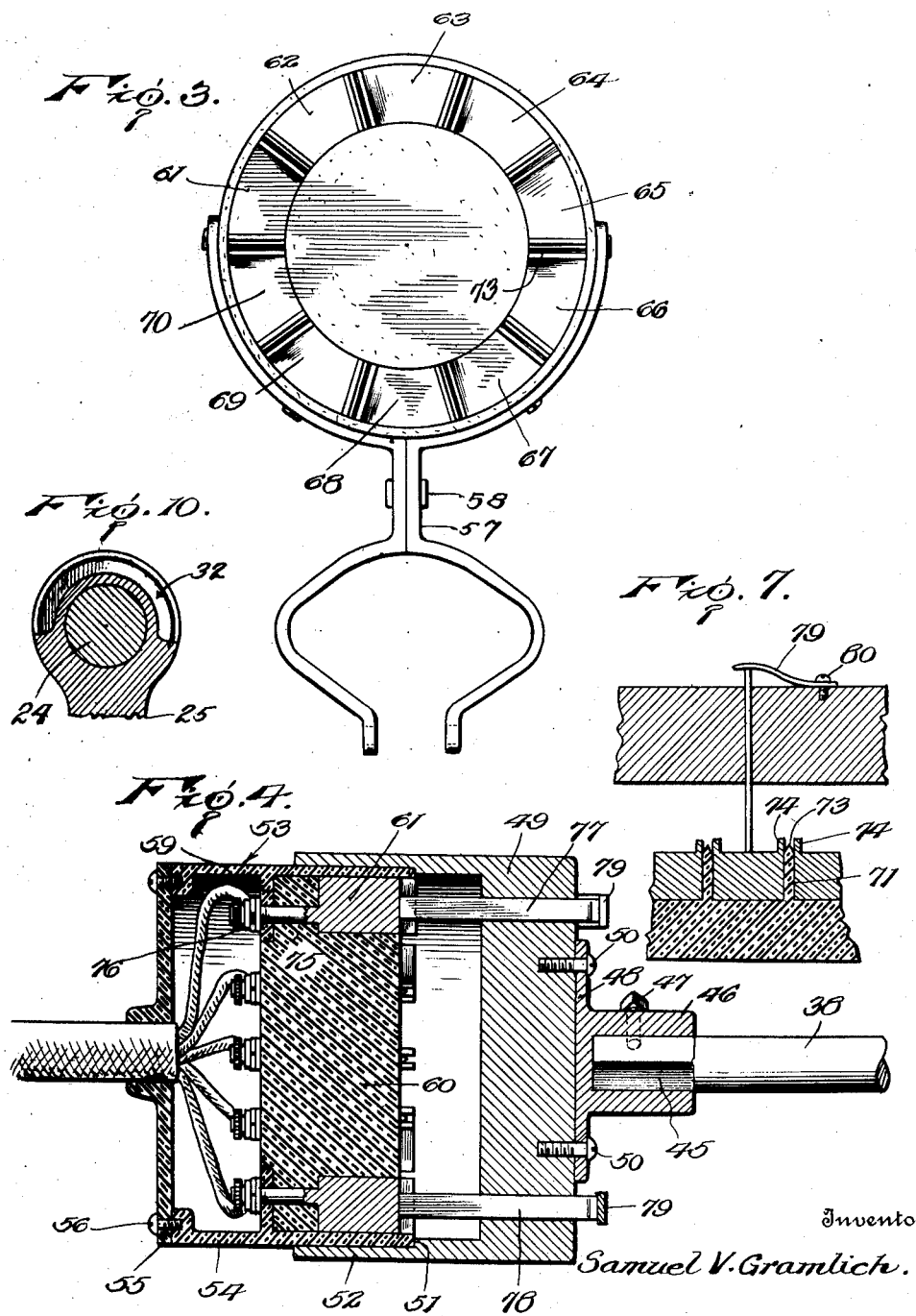

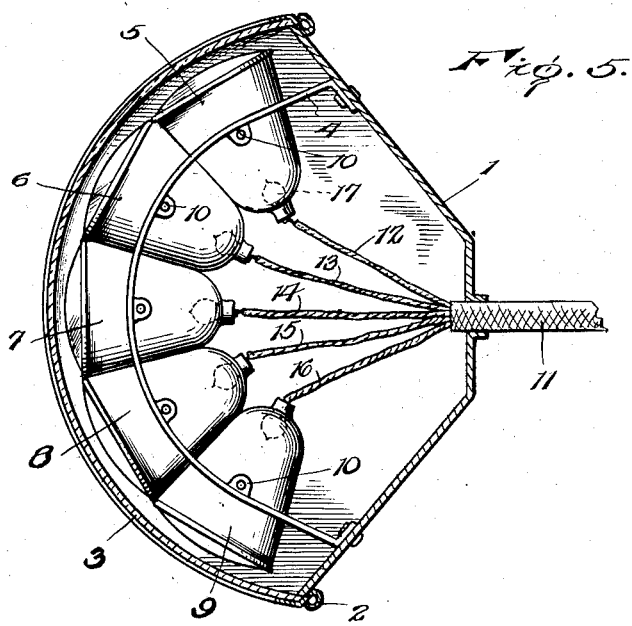
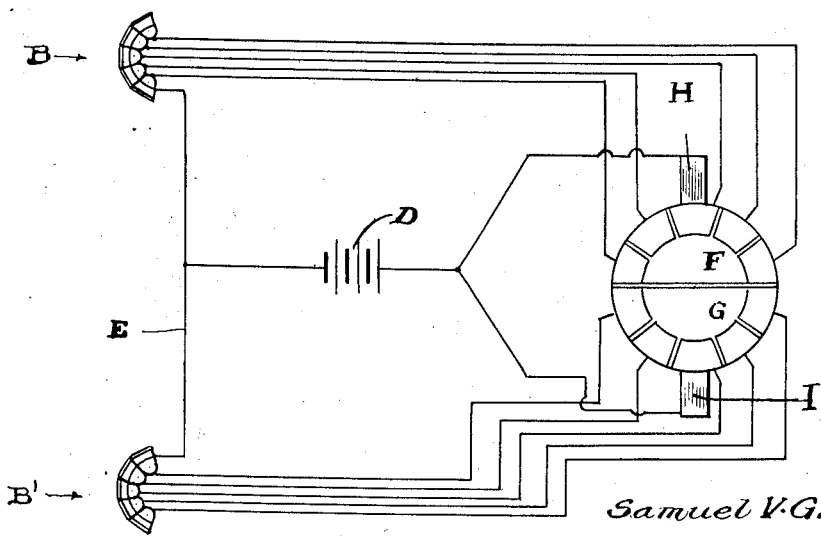

SAMUEL V. GRAMLICH, OF PARADOX, COLORADO.

ILLUMINATING SYSTEM FOR VEHICLES.

1,426,060.  Specification of Letters Patent.  Patented Aug. 15, 1922.

Application filed August 31, 1920. Serial No. 407,096.

*To all whom it may concern:*

Be it known that I, SAMUEL V. GRAMLICH, a citizen of the United States, residing at Paradox, in the county of Montrose and State of Colorado, have invented certain new and useful Improvements in Illuminating Systems for Vehicles, of which the following is a specification.

This invention relates to headlights for vehicles and more especially to that class wherein a beam of light is directed along the highway directly in the path of the vehicle by reason of being actuated by the steering movement of such vehicle.

In the present invention, as contradistinguished from previous forms in which the headlight is dirigible, the beam of light emanating from the headlight is changed or altered in direction depending on the steering movement of the vehicle, thus avoiding any complicated mechanism such as must necessarily be incorporated in devices where the light itself is moved.

According to one form of the present inventon, the respective headlights of a pair of headlights of a vehicle consists of a plurality of individual lights grouped in arcuate form in a horizontal plane, the individual lights of each headlight being controlled by the steering movement of the vehicle so that a beam of light from each headlight is always projected directly in the path of movement of the vehicle.

A further feature of the present invention resides in the provision of mechanism whereby the driver of the vehicle may manually control the invention for throwing the beams of light to one side or the other for the purpose of presenting a non-glaring headlight to the view of an on-coming vehicle without, in fact, diminishing the intensity of the light.

Another special feature resides in the provision of means for throwing the mechanism entirely out of operation for daylight driving.

In the drawings—

Figure 1 is a side elevation of a vehicle equipped according to the present invention;

Fig. 2 is an enlarged side elevation, partly in section, of the operating mechanism for the headlights;

Fig. 3 is a top plan view of the commutator mechanism with the cover removed;

Fig. 4 is a central section through the commutator;

Fig. 5 is a sectional view on the line 5—5 of Figure 1;

Fig. 6 is a diagrammatic view showing the lighting circuit;

Fig. 7 is a fragmentary sectional view showing the brush and commutator segment arrangement;

Fig. 8 is a fragmentary sectional view showing the co-operating elements for moving the commutator head;

Fig. 9 is a fragmentary view showing the controlling lever.

Fig. 10 is a fragmentary section on the line 10—10 of Fig. 9;

Fig. 11 is a fragmentary section in a vertical plane showing the arrangement of the spring pressed friction shoe and adjusting means bearing against the control rod.

In detail:

The usual vehicle A is equipped with at least two headlights B and B′ and probably a spot light C.

In the present invention these lights are all of identical construction and may comprise a body 1 flattened in a horizontal plane and closed by a bezel 2 carrying a transparency 3 of glass or the like. Within the body 1 and extending in arcuate form to conform to the bezel 2 is a frame 4 mounting individual lights 5, 6, 7, 8 and 9 so arranged and secured by means of fastening means 10 carried by the frame 4 that the light 7 faces directly forward whereas the other lights on each side of the light 7 cast their beams at an angle with respect to the axial line of the headlight 7. A cable 11 carrying a multiplicity of wires 12, 13, 14, 15 and 16 supplies current to the incandescent bulb 17 of the respective lights, frame 4 also being connected to one terminal of the source of electrical energy as will be hereinafter set forth.

The steering post 18 carries the usual steering wheel 19 secured in place by the cap nut 20 and beneath which is mounted a guard 21 enclosing the pinion 22 mounted on the upper end of the spindle of the steering post 18 and which meshes with a pinion or gear 23 of approximately double the diameter of the pinion 22. The pinion 23 is carried at the upper end of a shaft 24 mounted in a bracket 25 having the clamping ends 26 secured around the steering post by means of a bolt or other fastening means 27. The bracket 25 is provided with a housing 28 having a boss 29 mounting a spring pressed shoe 30 adjustable for tension by a nut 30' and which shoe engages shaft 24 to frictionally hold the same. To hold the pinion 23 into or out of engagement with the pinion 22 as desired, the shaft 24 also carries a handle 35 for manually moving said shaft and in which is mounted a finger plunger connected to a lever 33 fulcrumed on a lug 33' to engage notches 32 in the said bracket 25. The plunger is tensioned by a spring 35'. A bracket 36 is secured by bolts 37 and mounts a hollow shaft 38 slotted as at 39 to accommodate a pin 40 extending transversely through the shaft 24 which telescopes within the hollow of the shaft 38 whereby the two shafts are in keyed relation with each other for turning movement. Collars 41 and 42 secured to the shaft 38 by set screws 43 confine the latter with respect to the bracket 36. A spring 44 seated in the bottom of the hollow of the shaft 38 bears against the end of the shaft 24 thereby urging the pinions 22 and 23 into mesh. The end of the shaft 38 is squared as indicated at 45 and is received in a socket member 46 which is secured to the shaft 38 by a set screw 47, the flange 48 of said socket member 46 being held to a switch cap 49 of insulating material by screws 50. The switch cap 49 is shouldered as at 51 and flanged as at 52 to seat down over a switch box 53 which consists of a casing 54 having a bottom 55 secured in place by screws 56 and mounted on the steering column 18 by bracket 57 held thereto by bolts 58. The casing 54 is provided with an inwardly extending flange 59 upon which seats the insulating block 60 carrying segments 61, 62, 63, 64, 65, 66, 67, 68, 69 and 70 each of which is separated by the insulation fins 71 pointed to an edge as indicated at 73 and bounded at each side by the upstanding flanges 74 of adjacent segments. The shanks 75 of the respective segments are extended through the flange 59 and form binding posts 76 receiving the terminals of the wires 12 to 16 inclusive enclosed within the cable 11 on one-half of the switch and similar wires for another light on the other half of the switch. A brush for each half of the switch is provided and such brushes are mounted in the cap 49 at diametrically opposite points and are indicated at 77 and 78 and consist merely of spring blades, the upper ends of which are held to press downwardly by leaf springs 79 secured by screws 80. The spring brushes, as the head of the switch box is rotated through the shaft 38, snap over the respective segment divisions and drag across the segment bodies to form a proper connection and if, by chance, a brush should drop between a pair of adjacent flanges 74 the pointed edge of the insulation fin 73 between the segments would, since the edge of the fin lies below the upper edge of said flanges, deflect the brush to one side or the other and in contact with one flange or the other of a segment. In this way a certain connection is always established on movement of the brushes.

Now with particular reference to Figure 6 the two headlights of the vehicle A are, as previously mentioned, indicated at B and B'. The source of electrical energy which may be a battery, magneto, dynamo or the like is characterized by the reference letter D, the two independent halves of the switch are also indicated by F and G and the brushes for the respective halves by H and I. The wire E connects across one terminal of each of the lights comprising the headlight groups B and B' while a separate wire runs from each of the individual lights of the head light group B to the respective segments of the switch half F and similarly a separate wire runs from each of the individual lights of the head light group B' to the respective segments of the switch half G, the connections being so made that the middle light of each group is in circuit with the middle segment of each switch half respectively.

In the normal forward position of the steering gear brushes H and I are diametrically opposite and seat on the middle segment of the switch halves F and G and are each connected by suitable wires with one pole of the source of electrical energy D, the remaining pole thereof being connected with the wire E.

It will thus be seen that turning movement of the steering wheel of the vehicle will actuate the switch box head so that connections will be established through the system shown in Figure 6 whereby a beam of light from one of the respective headlight units of each headlight will always be directed in the path of movement of the vehicle, or, if the operator of the vehicle desires to swing the beam from one side to the other all he has to do is to disengage the pinion 23 from the pinion 22 and move the handle 35 in the desired manner.

In order that there may be no possibility of the lever 33 being accidentally disengaged by pressure on the actuating plunger therefor, the bracket 25 is provided at the notches 32 with overhanging lips or flanges which are engageable by the right angle end 32' of the lever. The construction is such that the handle 35 must first be operated for shifting the shaft 24 downwardly until the end 32' of the lever clears the adjacent flange before the plunger can be operated for rocking the lever to inactive position freeing the shaft.

Having thus described the invention, what is claimed as new is:

1. In a device of the character described, a rotatable element operated from the steering mechanism of an automobile, a fixed switch box having segments, a head rotatable upon the box and provided with a brush to coact with said segments, a shaft coupled with said element and connected to said head for rotating the head, the shaft being formed of telescopic sections whereby said shaft may be uncoupled from the element, a stationary bracket supporting the shaft, and manually releasable means carried by the shaft to coact with said bracket locking the shaft coupled with said element.

2. In a device of the character described, a rotatable element operated from the steering mechanism of an automobile, a fixed switch box having segments, a head rotatable upon the box and provided with a brush to coact with said segments, a shaft detachably coupled with said element and connected to said head for rotating the head, a handle extending from the shaft for manually rotating the shaft independently of the element when disconnected therefrom, a stationary bracket supporting the shaft, and a manually operable lever carried by the shaft to coact with said bracket locking the shaft coupled with the element.

3. In a device of the character described, a rotatable element, a fixed switch box having an insulating block therein, segments mounted upon said block, a head rotatable upon the box, a spring pressed resilient brush reciprocable through the head and disposed to ride over said segments, and a shaft coupled with the element and connected to said head for rotating the head, the segments having pairs of confronting flanges and the block having fins projecting between the flanges of said pairs and provided with beveled edges located below the upper edges of the flanges whereby when the brush drops between a pair of flanges, the beveled edge of the fin therebetween will deflect the brush into contact with either one or the other of the flanges of the pair.

In testimony whereof I affix my signature.

SAMUEL V. GRAMLICH. [L. S.]